US005680292A

United States Patent [19]

Thompson, Jr. et al.

[11] Patent Number: 5,680,292

[45] Date of Patent: Oct. 21, 1997

[54] HIGH SURFACE AREA NITRIDE, CARBIDE AND BORIDE ELECTRODES AND METHODS OF FABRICATION THEREOF

[75] Inventors: Levi T. Thompson, Jr., Northville; Michael R. Wixom, Ann Arbor; Jeffery M. Parker, Belleville, all of Mich.

[73] Assignee: T/J Technologies, Inc., Northville, Mich.

[21] Appl. No.: 354,289

[22] Filed: Dec. 12, 1994

[51] Int. Cl.[6] ........................ H01G 9/04

[52] U.S. Cl. ........................ 361/528; 427/530; 427/528; 361/532

[58] Field of Search ........................ 361/503, 528, 361/512, 504, 321.1, 502, 508, 516, 523, 524; 427/79, 80, 113, 126.3, 126.2, 530, 528, 531; 29/25.03

[56] References Cited

U.S. PATENT DOCUMENTS

| | | | |
|---|---|---|---|
| 4,271,041 | 6/1981 | Boudart | 252/438 |
| 4,327,400 | 4/1982 | Muranaka | 361/433 |
| 4,515,763 | 5/1985 | Boudart | 423/409 |
| 4,851,206 | 7/1989 | Boudart | 423/409 |
| 5,062,025 | 10/1991 | Verhoeven | 361/509 |
| 5,079,674 | 1/1992 | Malaspina | 361/502 |
| 5,185,679 | 2/1993 | Maniar | 361/318 |

*Primary Examiner*—Leo P. Picard
*Assistant Examiner*—Anthony Dinkins
*Attorney, Agent, or Firm*—Gifford, Krass, Groh, Sprinkle, Patmore, Anderson & Citkowski

[57] ABSTRACT

High surface area electrodes for use in electrical and electrochemical energy storage and conversion devices comprise conductive transition metal nitrides, carbides, borides or combinations thereof where the metal is molybdenum or tungsten. Disclosed is a method of manufacturing such electrodes by forming or depositing a layer of metal oxide, then exposing the metal oxide layer at elevated temperature to a source of nitrogen, carbon or boron in a chemically reducing environment to form the desired metal nitride, carbide or boride film. Also disclosed is an ultracapacitor comprised of the new high surface area electrodes having a specific capacitance of 100 $mF/cm^2$ and an energy density of 100 $mJ/cm^3$ with improved conductivity and chemical stability when compared to currently available electrodes.

10 Claims, 3 Drawing Sheets

YY

XX

ZZ

HIGH SURFACE AREA NITRIDE, CARBIDE AND BORIDE ELECTRODES AND METHODS OF FABRICATION THEREOF

BACKGROUND—FIELD OF THE INVENTION

This invention relates generally to capacitors, batteries, fuel cells, electrochemical synthesis reactors, sensors and other energy storage/conversion devices, and more particularly to electrodes for use in such devices.

BACKGROUND—DISCUSSION OF PRIOR ART

Electrodes are key elements in several classes of energy storage and conversion devices, including for example, batteries, fuel cells, and capacitors. Technological advances in the electronics industry have created a substantial and on-going need to reduce electrode volume and weight to attain increased electrical and electrochemical energy and power densities. In general, advances in miniaturization and weight reduction of energy storage devices have not kept pace with the miniaturization and portability of other electronic components.

Electrical and electrochemical energy storage and peak power generally scale with the available surface area of the electrode. Hence, a route to increasing the ratio of stored energy and peak power to the weight and volume of the electrodes is to increase the surface area of the electrodes.

Prior art teaches numerous ways to produce materials with high specific areas (surface area divided by the mass or volume of the bulk material). U.S. Pat. No. 4,515,763 and U.S. Pat. No. 4,851,206 teach the preparation of such materials as metallic carbide and nitride powder catalysts. These patents, however, do not teach conductivity or stability in electrolytic solutions or the application of these powder catalysts to electrodes.

Prior art identifies three basic types of high surface area electrodes. One type consists of metallic bodies which are mechanically or chemically etched to provide a roughened surface and high specific surface area. High surface area electrodes based on etched or patterned metal surfaces are cited in U.S. Pat. No. 5,062,025. A second type of high surface area electrode is based on carbon powders or foams, as cited in U.S. Pat. No. 5,079,674 and U.S. Pat. No. 4,327,400. The third class of high surface area electrodes is based on conductive metal oxides, e.g. ruthenium oxides, as taught by U.S. Pat. No. 5,185,679. While each of these types of electrodes are the basis of commercial electrical or electrochemical energy storage and conversion devices, they are lacking in performance with respect to one or more of the criteria listed in the Summary below.

Specifically, currently available high surface area metal electrodes are limited by electrochemical stability. Metals are generally unstable in oxidizing environments, therefore their use is limited to the positive, reducing electrode or anode.

High surface area carbon electrodes are limited by their relatively low electrical conductivity and difficulty in controlling the pore size distribution and surface area. Most high surface area carbon-based electrodes are formed by dispersing and bonding the carbon materials onto more highly conductive supports or substrates. These multi-step processes require the use of dispersants, binders and conductivity enhancing additives.

High surface area ruthenium oxide based electrodes are also limited by electrochemical stability and by the cost and availability of the electrode materials. Prior art has shown that additives can be used to stabilize the high surface area of the ruthenium oxide when used as the negative, oxidizing electrode or cathode. Unfortunately, ruthenium oxide, and metal oxides in general cannot be stabilized for use as the positive, reducing electrode, or anode. These materials are limited to positive electrical potentials of the order of 1.2 volts, beyond which electrochemical reactions occur, resulting in the irreversible degradation of the electrode materials.

SUMMARY OF THE INVENTION

For use as electrodes, additional chemical and physical properties are desired. The electrode material must be substantially and highly electrically conductive, with the possible exception of a thin dielectric or passivating layer on the exposed surfaces. The high surface area electrode material must also be chemically and physically stable under a range of processing and operating environments. Specifically, the electrode material must retain its high surface area and pore size distribution in the presence of the ion-mobile electrolytes typically used in electrical and electrochemical energy storage and conversion devices. Furthermore, it is desirable that the electrode material retain these desirable properties under a range of positive and negative electrical potentials which may occur, by design or unintentionally, during the operation of the energy storage and conversion devices. In addition to having high surface area, high electrical conductivity, and physical/chemical stability, the electrode materials should be easily wetted by the ion-mobile electrolyte, should be amenable to existing manufacturing processes and production equipment, and should be assembled from inexpensive, widely available, and environmentally acceptable materials.

The present invention provides a new type of high surface area electrode for use in electrical and electrochemical energy storage and conversion devices. The electrode comprises conductive transition metal nitrides, carbides, borides or combinations thereof, where the metal is typically molybdenum or tungsten.

In another embodiment there is provided a method of manufacturing the electrode of this invention, comprising forming or depositing a layer of metal oxide where the metal is typically molybdenum or tungsten, then exposing the metal oxide layer at elevated temperature to a source of nitrogen, carbon, or boron in a chemically reducing environment to form the desired metal nitride, carbide or boride film. With careful control of the exposure conditions, the nitridation, carburization, or boridation chemical reaction can lead to greatly enhanced specific surface areas relative to the film precursors. Nitrogen, carbon and boron sources are typically ammonia, methane, and diborane, respectively.

In another embodiment there is provided an ultracapacitor device comprised of the subject high surface area electrodes having a specific capacitance of 100 $mF/cm^2$ and an energy density of 100 $mJ/cm^3$ with improved conductivity and chemical stability when compared to currently available electrodes.

DESCRIPTION OF THE PREFERRED EMBODIMENTS

High specific surface area nitrides, carbides and borides are produced by reacting a precursor with a source of nitrogen, carbon or boron at an elevated temperature, or by interconverting the nitride, carbide or boride by reaction with an appropriate source of nitrogen, carbon or boron.

Figure 1:
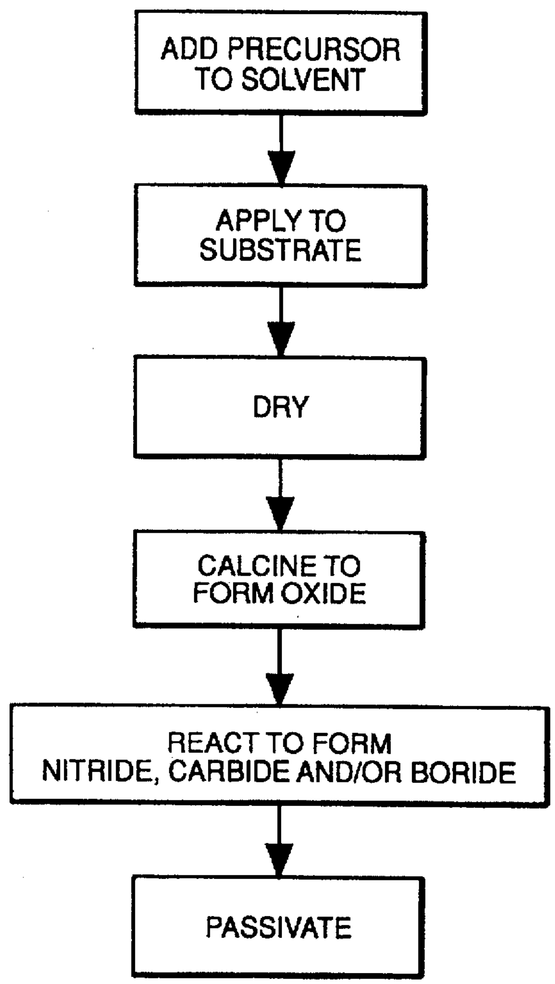
FIG. 1 is a block flow diagram illustrating method steps for fabricating the high surface area electrodes.

Referring to FIG. 1, metal oxide or soluble precursors are mixed into an appropriate solvent in the desired concentrations. Suitable compounds are materials such as water soluble salts, organometallic complexes and alkoxides of metals such as chromium, molybdenum, tungsten, vanadium, niobium, tantalum, titanium and zirconium. These metals and others are selected from Groups III, IV, V, VI and VII of the Periodic Table. The solution is applied by dip coating or spray deposition to a substrate. Other deposition methods such as physical vapor deposition (evaporative coating) or plasma arc spraying may be selected. Suitable substrates are materials like titanium, zirconium, tantalum, molybdenum, tungsten and ruthenium oxide. These metals and others are selected from Groups IV, V, VI, VII and VIII of the Periodic Table. Once the precursor solution has been applied to the substrate, the material is dried at an appropriate temperature.

The dried material is chemically converted to the oxides by reacting with an oxidizing agent. Alternately, the surface of an appropriate substrate material can be oxidized by reaction with a suitable oxidizing agent or an oxide film can be deposited from the vapor phase onto the substrate. Suitable oxidizing agents are materials such as oxygen, water, nitrogen oxides, and carbon oxides.

Figure 2:
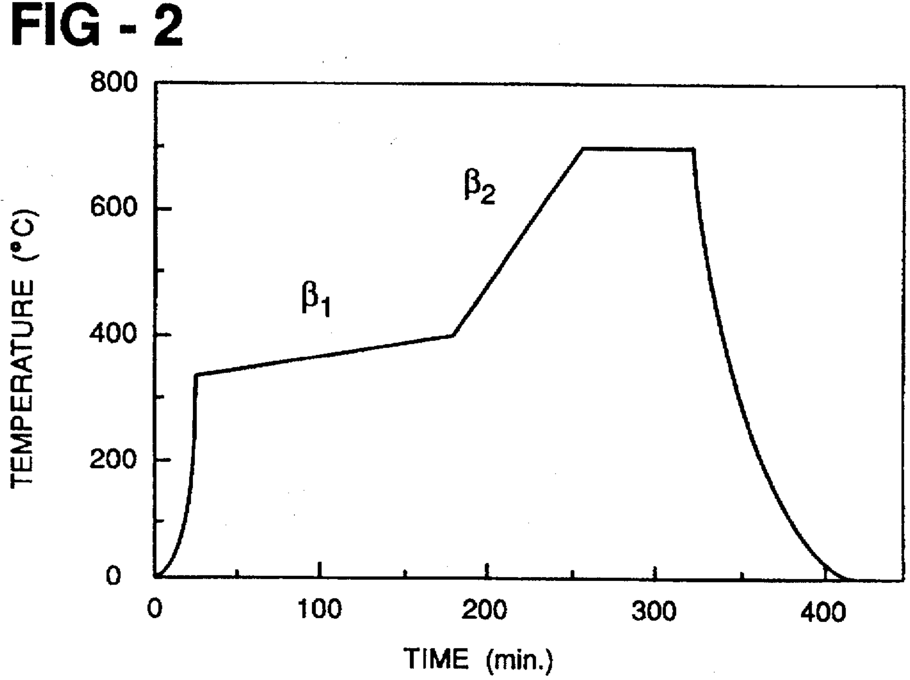
FIG. 2 is an example of the temperature program used to convert an oxide film to a high surface area electrode.

The oxide film is chemically converted to the nitride, carbide and/or boride by reacting with a reductant as the temperature is increased in a controlled manner. The rate of increase in the temperature may be linear (0° K./hr to 500° K./hr), for example as illustrated in FIG. 2, or nonlinear but should be uniform without sudden changes in rate. Suitable reductants include ammonia, hydrazine, nitrogen, methyl amine, methane, ethane, borane and diborane. The reaction should be rapidly quenched after completion or held at the final reaction temperature (500° K. to 1300° K.) for a period of time then quenched to room temperature. Hydrogen and/or inert gas may be added to assist the conversion. The thickness of the nitride, carbide and/or boride film determines the final surface area or capacitance. Capacitance generally scales with film thickness; however, with sufficient increase in thickness, the capacitance eventually approaches an asymtotic limit.

Figure 3:
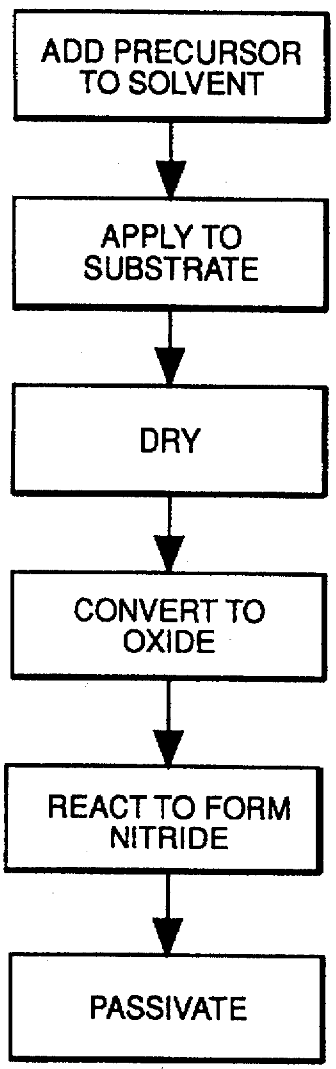
FIG. 3 is a block flow diagram illustrating other method steps for fabricating the high surface area electrodes.

Referring to FIG. 3, a high surface area nitride film produced using methods illustrated in FIG. 1 may be converted into the carbide or boride. The nitride is chemically converted to the carbide and/or boride by reacting with a suitable reactant such as methyl amine, methane, ethane, borane and/or diborane. The reaction may be carried out isothermally or in a temperature programmed manner. After completion, the reaction should be rapidly quenched or held at the final reaction temperature for a period of time then quenched to room temperature. Hydrogen and/or inert gas may be added to assist the conversion. The thickness of the carbide and/or boride film determines the final surface area or capacitance.

The nitride intermediate step followed by conversion to carbide or boride appears to provide better properties for an ultracapacitor; however, direct conversion from oxide to carbide or boride can be accomplished with a suitable reductant as noted above.

The high surface area nitride, carbide and/or boride film may be passivated by exposing the materials to a dilute mixture of an oxidizing agent for a short period of time.

Figure 4:
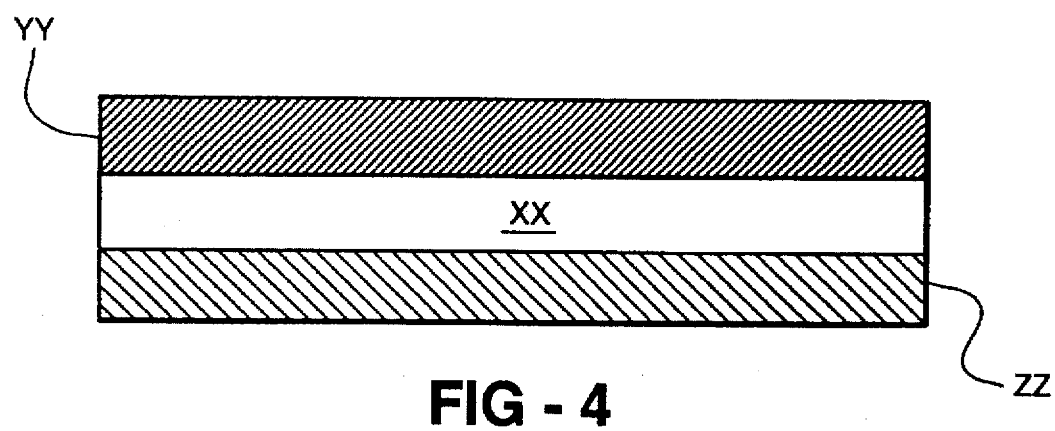
FIG. 4 is a schematic and enlarged illustration of a capacitor in accordance with the invention.

In order to better understand the structure of the capacitor, we refer now to an enlarged view of a portion of the device in FIG. 4. A separator xx is applied to a high surface area electrode zz. A second electrode yy is used to sandwich the separator xx. The first and second electrodes do not have to be made of the same materials. For example, one electrode may be a high surface area nitride, carbide and/or boride while the other is a ruthenium oxide-based material. The oxide-based electrode material may be an oxide formed on a base metal surface or foil. The sandwich is impregnated with an ion-mobile electrolyte solution. Suitable electrolytes include aqueous sulfuric acid, a solution of lithium perchlorate in propylene carbonate or a solution of tetrabutyl ammonium fluoride in acetonitrile. Special care must be taken to dry the non-aqueous electrolytes. Residual water can be removed from the impregnated sandwich by electrolysis (applying a positive potential of 2–4 V).

An alternative capacitor can be fabricated by using a solid electrolyte in place of the liquid electrolyte and separator. The solid electrolyte must be infiltrated or diffused into the pore structure of the high surface area electrodes.

Variations in the construction of the electrode and devices described herein, while not described in detail, will be obvious to those with ordinary skill in the art, and would not be construed as being beyond the scope of the invention. For example, one practiced in the state of the art for electrochemistry will also perceive that variations of the electrode materials described herein may have advantageous applications in fuel cells, electrochemical synthesis reactors, catalysts, and sensors.

EXAMPLES

The following test examples are offered by way of example and not by way of limitation.

The molybdenum oxide films were deposited onto high purity Ti (99.7% 0.0127 mm, Aldrich) Mo (99.9% 0.025 mm, Aldrich) foils. The foils were cleaned prior to depositing the oxide in order to remove any organic residue or surface oxides. The Ti foils were cleaned at room temperature using a 2:1 mixture of 12M nitric acid and 50% hydrofluoric acid. The foil substrate were immersed in the acid solution until red fumes evolved at which time the substrate was removed and rinsed with copious amounts of distilled water. The Mo foils were cleaned by immersion in an aqueous 18M sulfuric acid bath at ~75° C. The foil cleaning procedures were adapted from methods described in the *Metal Finishing Guidebook and Directory* (1993). After a period of 15 minutes or until a water-break-free surface was obtained, the foils were removed from the acid bath and then rinsed with distilled water. After cleaning, the substrates were placed immediately in the coating solution in order to minimize oxidation prior to deposition.

Aqueous solutions of ammonium paramolybdate, $(NH_4)_6Mo_7O_{24}\cdot 4H_2O$ (99.999%), Johnson Matthey), were used to deposit the molybdenum oxide coatings. After an appropriate amount of the salt was dissolved in distilled water, the solutions were acidified with 10% nitric acid. The coating solutions were initially stirred using the substrate to ensure that the solution concentrations were uniform. The substrates were suspended at least one centimeter below the liquid surface for 5 minutes. The substrates were then drawn out of the solution at a draw rate of 1 s/cm. The coated substrates were dried on a hot plate (the temperature was less than 90° C.) prior to calcination.

The molybdate coatings were converted into $MoO_3$ by calcination in stagnant air for 30 minutes at temperatures less than 550° C.

Temperature programmed nitridation of the $MoO_3$ films was carried out in a specially designed reactor. This reactor was constructed from a one inch diameter quartz tube and fitted with a water jacket to cool the effluent gases. The calcined substrates were placed on a firebrick inside the reactor which was placed in a Lindberg SB tube furnace. The temperature was controlled using an Omega CN2010 programmable temperature controller with a chromel-alumel thermocouple. High purity $NH_3$ (99.99%, Matheson) was used for nitridation. Referring to FIG. 2, the reaction temperature was quickly increased from room temperature to 350° C. over 30 minutes. Two linear heating segments were employed in nitriding the oxide films. The temperature was increased from 350° to 450° C. at rate $\beta_1$ then from 450° to 700° C. at a rate $\beta_2$. Subsequently, the temperature was held constant at 700° C. for one hour. After the nitridation program was completed, the materials were cooled to room temperature in flowing $NH_3$, then passivated in a flowing mixture of 1.06% $O_2$ in He for one hour in order to prevent bulk oxidation. The gas flow rates were monitored using a calibrated rotameter and controlled by needle valves.

Figure 5:
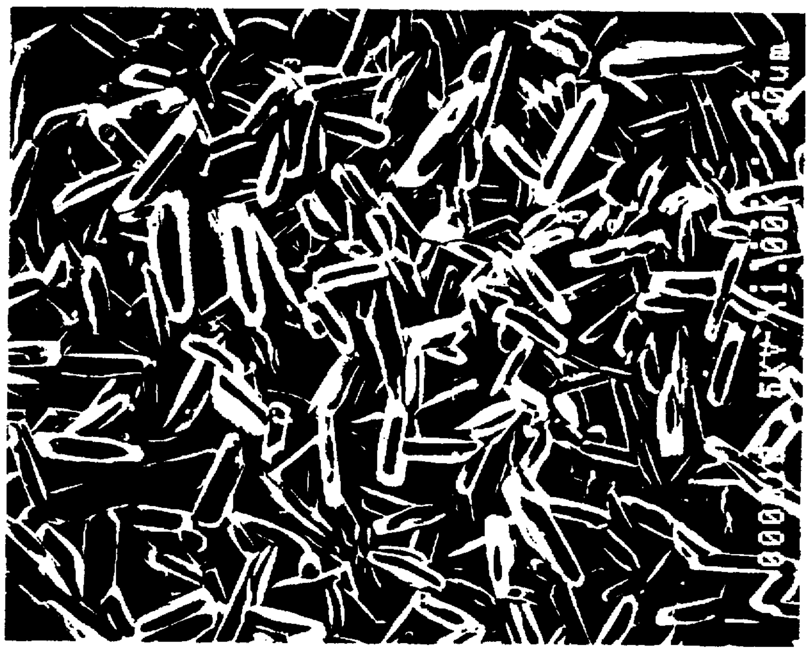
FIG. 5 is a scanning electron micrograph of an oxide film prior to nitridation, carburization and/or boridation at a magnification of 1,000×.
Figure 6:
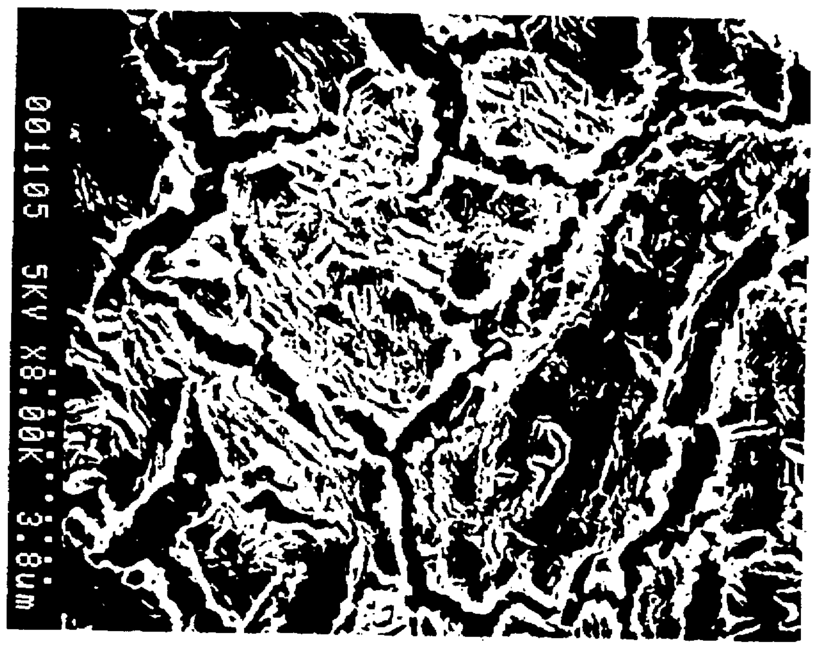
FIG. 6 is a scanning electron micrograph of a film after nitridation, carburization and/or boridation at a magnification of 8,000×.

The $MoO_3$ films supported on Mo substrates possessed porous microstructures and consisted of platelike particles averaging 2 μm in thickness and 10 μm in diameter (see FIG. 5). The $MoO_3$ supported on Ti substrates was also porous but consisted of very fine grains approximately 2 μm in diameter. The gross morphologies of the nitrided films were similar to those of the oxides, however, the nitride particles contained very fine cracks (see FIG. 6). The development of cracks would lead to the exposure of internal surface area and production of high surface area materials. Finally, it was observed that there was much less surface charging during scanning electron micrography (SEM) for the nitride films than for the oxide films, which is consistent with the nitride films being electrically conductive.

The weights and BET (Brunauer, Emmett and Teller) surface areas of the Mo nitride films increased with each dip. The materials listed in Table 1 were prepared via the temperature programmed nitridation of $MoO_3$ films in flowing $NH_3$ (100 $cm^3$/min) using first and second heating rates of 40° and 200° C./h, respectively. The choice of substrate had a marked effect on the weight of $\gamma$-$Mo_2N$ generated. The weights and surface areas of the nitride films supported on Mo substrates were generally higher than those of the films supported on Ti substrates. The surface area increased nearly linearly with film weight for both substrates indicating that the specific surface area was not a strong function of the substrate employed. There was no evidence of delamination, occlusion or consolidation. These observations suggested that the films were porous and that the nitride surface area per unit substrate area can be increased by increasing the coating mass and thickness.

TABLE 1

Weights and Surface Areas of the Mo Nitride Films

| Sample | Weight (mg) | Surface Area ($cm^2/cm^2$) | Specific Surface Area ($m^2$/gr) |
|---|---|---|---|
| Mo-5.0-0.2-1-1 | 1.3 | 735 | 57 |
| Mo-5.0-0.2-1-2 | 2.7 | 1469 | 54 |
| Mo-5.0-0.2-1-4 | 4.7 | 3131 | 67 |
| Ti-5.0-0.2-1-1 | 0.5 | 88 | 18 |
| Ti-5.0-0.2-1-2 | 0.5 | 346 | 59 |
| Ti-5.0-0.2-1-4 | 2.8 | 1037 | 37 |

The surface areas were functions of the heating rates and flow rate employed during nitridation. Effects of the nitridation conditions on the surface areas of the Mo nitride films can be deduced from the results given in Table 2. When the nitridation program with $\beta_1$ and $\beta_2$ equal to 100° and 200° C./h, respectively, was employed, the surface area decreased as the flow rate was increased. A similar behavior was observed when both of the heating rates were 100° C./hr. The opposite effect was observed when the heating schedule with $\beta_1$ and $\beta_2$ equal 40° and 200° C./h, respectively, was used.

Effects of similar magnitude were observed on varying the first heating rate $\beta_1$. When the nitridation was carried out using the low flow rate (100 $cm^3$/min), increasing $\beta_1$ caused a decrease in the surface area. For films prepared using the high flow rate (1000 $cm^3$/min), increasing $\beta_1$ caused an increase in the surface area. The most significant changes were observed when the second heating rate was varied. Increasing $\beta_2$ caused a marked decrease in the surface area. Furthermore, surface areas in excess of 70 $m^2$/gr were achieved using the low value for $\beta_2$.

TABLE 2

Effects of the Nitridation Conditions on the Mo Nitride Surface Areas

| Sample | $\beta_1$ (°C./hr) | $\beta_2$ (°C./hr) | $Q_{NH3}$ ($cm^3$/min) | Surface Area ($cm^2/cm^2$) | Specific Surface Area ($m^2$/gr) |
|---|---|---|---|---|---|
| Mo-5.0-0.2-1-2A | 100 | 200 | 1000 | 3574 | 44 |
| Mo-5.0-0.2-1-2B | 100 | 200 | 100 | 1868 | 37 |
| Mo-5.0-0.2-1-2C | 100 | 100 | 1000 | 2213 | 105 |
| Mo-5.0-0.2-1-2D | 100 | 100 | 100 | 1314 | 73 |
| Mo-5.0-0.2-1-2E | 40 | 200 | 1000 | 1970 | 35 |
| Mo-5.0-0.2-1-2F | 40 | 200 | 100 | 1469 | 54 |

The capacitor test cell consisted of a 100 ml round-bottom flask with a tapered ground-glass joint. A rubber stopper with holes for the leads was used to seal off the flask. Either 2.39M $LiClO_4$ (99.99%, Aldrich) in propylene carbonate (99% anhydrous, Johnson Matthey) or 4.18M $H_2SO_4$ in distilled water was used as the electrolyte. The cell containing the perchlorate solution was assembled in a $N_2$-filled glovebox to avoid exposure to moisture. Electrical measurements using the $H_2SO_4$ solution were carried out in ambient air. Fisherbrand P8, coarse porosity filter paper was used to separate the electrodes in the perchlorate solution while Fisherbrand glass fiber circles (coarse porosity) were used for the acid solution. The capacitor was fabricated by placing a separator between two electrodes and clamping them together with an alligator clip to secure the assembly. Additional shielded alligator clips were used to connect the foil leads to the voltage source and the coulometer. The cells were charged with a constant voltage source supplied by 1.5 Vdc batteries used separately or in a series of four to obtain voltages greater than 6 Vcd. The total charge capacity was measured while allowing the capacitor cell to fully discharge. The capacitance was taken as the total charge stored divided by the charging voltage. The total charge stored by the capacitor was measured using an EG&G 279©A coulometer, which was calibrated against two commercial capacitors.

Tables 3 and 4 summarize effects of the film properties, electrolyte composition, and charging voltage on the electrical performance of the test capacitors. Charging times between 1 and 10 minutes were used and the specific capacitance is based on the superficial area of the substrate ($\approx$1 $cm^2$). The capacitances of the cells fabricated from the nitride films were much greater than those of blank cells assembled using uncoated metal substrates. This clearly indicated that the capacitance was due to the presence of the nitride film. Furthermore, the electrical properties were reproducible through several charge/discharge cycles suggesting that the films were stable even at voltages greater than 6V.

In every case, the capacitors fabricated using the Mo substrates had higher capacitances than those consisting of the Ti substrates. The choice of electrolyte also played a major role in determining the charge storage capacity. The specific capacitances achieved using the $H_2SO_4$ electrolyte approached 1 F/$cm^2$ while those for the $LiClO_4$ electrolyte ranged from 0.02 to 0.14 F/$cm^2$.

The capacitance increased linearly with the surface area of the Mo nitride film for the cell using $H_2SO_4$ as the electrolyte. This result clearly demonstrated four properties of the Mo nitride. (1) $\gamma$-$Mo_2N$ is an electrically conducting phase. (2) The high surface area Mo nitrides prepared using the methods outlined above formed contiguous films. (3) The capacitance for the $\gamma$-$Mo_2N$ based electrodes was likely due to a surface and not a bulk charge storage process. (4) The capacitance of 200 $\mu$F/$cm^2$ is superior to that reported for high surface area ruthenium oxide electrodes with $H_2SO_4$ electrolyte (Raistrick and Sherman, 1987).

TABLE 3

Properties of Mo Nitride Electrodes with $LiClO_4$ Electrolyte (1.6 Vdc)

| Sample | Charging Voltage (V) | Total Charge Stored (C) | Specific Capacitance (mF/$cm^2$) |
|---|---|---|---|
| Mo Foil (cleaned) | 1.59 | 0.0004 | 0.2 |
| Mo-5.0-0.2-1-2A | 1.58 | 0.068 | 43 |
| Mo-5.0-0.2-1-2B | 1.60 | 0.034 | 22 |
| Mo-5.0-0.2-1-2C | 1.59 | 0.072 | 45 |
| Mo-5.0-0.2-1-2D | 1.59 | 0.127 | 80 |
| Mo-5.0-0.2-1-2E | 1.60 | 0.097 | 61 |
| Mo-5.0-0.2-1-2F | 1.57 | 0.119 | 76 |
| Ti Foil (cleaned) | 1.59 | 0.0004 | 0.2 |
| Ti-5.0-0.2-1-2 | 1.59 | 0.027 | 17 |

TABLE 4

Properties of Dip-Coated Mo Nitride Electrodes with $H_2SO_4$ Electrolyte

| Sample | Charging Voltage (V) | Total Charge Stored (C) | Specific Capacitance (mF/$cm^2$) |
|---|---|---|---|
| Mo Foil (cleaned) | 1.59 | 0.265 | 167 |
| Mo-5.0-0.2-1-2A | 1.58 | 1.39 | 880 |
| Mo-5.0-0.2-1-2B | 1.60 | 0.643 | 405 |
| Mo-5.0-0.2-1-2C | 1.59 | 0.701 | 441 |
| Mo-5.0-0.2-1-2D | 1.57 | 0.790 | 454 |

TABLE 4-continued

Properties of Dip-Coated Mo Nitride Electrodes with $H_2SO_4$ Electrolyte

| Sample | Charging Voltage (V) | Total Charge Stored (C) | Specific Capacitance (mF/$cm^2$) |
|---|---|---|---|
| Mo-5.0-0.2-1-2E | 1.60 | 0.638 | 401 |
| Mo-5.0-0.2-1-2F | 1.57 | 0.791 | 504 |
| Ti Foil (cleaned) | 1.59 | 0.00007 | 0.04 |
| Ti-5.0-0.2-1-2 | 1.59 | 0.059 | 37 |

Molybdenum nitride electrodes were also prepared by spray deposition of paramolybdate precursors. Solutions of the paramolybdate precursor were prepared as described above for spray deposition of the oxide coatings. An ultrasonic spray system or atomized spray deposition can be used to deposit the oxide precursor onto the substrates. The process of spray deposition and calcination were alternated to build up a multi-layer of the oxide. The substrates were heated to a temperature of about 150° C. to evaporate the solvent and enhance adhesion, and then calcined as described above. The heating rates ($\beta_1$ and $\beta_2$) and capacitance results for the spray coated molybdenum nitride electrodes are shown in Table 5.

TABLE 5

Properties of Spray Deposited Mo Nitride Electrodes with $H_2SO_4$ Electrolyte

| $\beta_1$ (°C./hr) | $\beta_2$ (°C./hr) | Specific Capacitance (F/$cm^2$) |
|---|---|---|
| 80 | 400 | 1.65 ± 0.04 |
| 20 | 100 | 1.91 ± 0.05 |
| 80 | 100 | 1.61 ± 0.02 |
| 80 | 200 | 1.86 ± 0.04 |
| 20 | 200 | 1.54 ± 0.03 |
| 40 | 400 | 1.86 ± 0.07 |
| 40 | 100 | 1.11 ± 0.06 |

The electrode capacitances in Table 5 were obtained by coulometry as described previously. The electrolyte used was 4.5M. sulfuric acid. Each capacitor was charged at 1.0 V with a current of 150 mA for a duration of 5 minutes to ensure charge saturation. These results demonstrate that spray deposition can also be used to produce molybdenum nitride electrodes with beneficial high surface areas.

Other new high surface area electrodes were also prepared as demonstrations of the materials and methods of this invention.

Molybdenum carbide electrodes were prepared from molybdenum nitride electrodes, prepared using the spray deposition, calcination, and nitridation methods as previously described. The nitride was converted to carbide by temperature programmed reaction with a flowing 1:3 mixture of methane/hydrogen. The temperature programmed reaction heating profiles and reactant flow rates are provided in Table 6 below. Cyclic voltammetry was performed to determine the capacitance and stability of the carbide films in saturated aqueous KCl and LiCl electrolyte solutions. Capacitance, C, was determined by dividing the voltammetry, i, by the potential stepping rate, (dE/dt) over the plateau region of the voltammogram: C=i/(dE/dt). The sample electrode sewed as the working electrode in a standard three electrode cyclic voltammetry configuration. The capacitance data indicate that molybdenum oxide precursors can be converted into carbide electrodes with beneficial high surface areas.

TABLE 6

Capacitance of Carbide Films

| Heading Rate β (°C./Hr) | Flow Rate (cc/min) | Capacitance ($F/cm^2$) KCl electrolyte | Capacitance ($F/cm^2$) LiCl electrolyte |
|---|---|---|---|
| 22 | 100 | 2.32 | 2.18 |
| 22 | 500 | 1.37 | 1.51 |
| 67 | 100 | 1.61 | 1.03 |
| 67 | 500 | 1.11 | 0.88 |

Tungsten/molybdenum nitride electrodes were prepared by spray deposition of paratungstate/paramolybdate solutions. Solutions of the mixed W/Mo oxide precursors were prepared by mixing equal volumes of saturated solutions of $(NH_4)_6Mo_7O_{24}.4H_2O$ and $(NH_4)_{10}W_{12}O_{41}.5H_2O$. Spray deposition, calcination, and nitridation were performed as described in previous examples. Capacitance was evaluated by cyclic voltammetry. Capacitance for these films is reported in Table 7. The capacitance data confirm that W/Mo solid oxide solutions can also be converted to beneficial high surface area electrode films. Table 7 also shows the cell loading in $mg/cm^2$. Since the specific capacitance scales with loading, one may increase electrode capacitance by increasing the loading.

Vanadium nitride electrodes were prepared by spray deposition of saturated ammonium vanadate $(NH_4)VO_3$ solutions. Spray deposition, calcination, and nitridation were performed using the procedures as described for molybdenum nitride electrodes. Capacitance was evaluated by cyclic voltammetry. The capacitance for these films as reported in Table 7 confirm that vanadium, a group Va element, can also be convened to beneficial high surface area electrode films.

TABLE 7

| Electrode Material | Loading ($mg/cm^2$) | Capacitance ($F/cm^2$) |
|---|---|---|
| molybdenum nitride | 13 | 1.9 |
| tungsten/ molybdenum nitride | 5.5 | 0.3 |
| vanadium nitride | 4.9 | 0.3 |

We claim:

1. A high specific surface area electrode comprising a substrate and a film layer thereon selected from the group consisting of nitrides, carbides and borides of the metals of the Groups III, IV, V, VI and VII of the Periodic Table.

2. The high specific surface area electrode of claim 1 wherein the film layer is first applied to the substrate as an oxide of at least one of the metals from Groups III, IV, V, VI and VII of the Periodic Table and the film layer subsequently reacted with a source of nitrogen, carbon or boron.

3. The high specific surface area electrode of claim 1 wherein the metal of the film layer comprises at least two metals from Groups III, IV, V, VI and VII of the Periodic Table.

4. The high specific surface area electrode of claim 1 wherein the substrate and the film layer metal are the same.

5. The high specific surface area electrode of claim 1 wherein the film layer metal is selected from the group Mo, W or V.

6. The high specific surface area electrode of claim 1 wherein the substrate is selected from the group Mo, W or Ti.

7. The high specific surface area electrode of claim 1 wherein the film layer is formed by step wise first reacting the substrate surface with an oxidizing agent followed by reacting the oxidized substrate surface with a source of nitrogen, carbon or boron.

8. The high specific surface area electrode of claim 7 wherein the oxidized surface is reacted with the source of nitrogen prior to being reacted with a source of carbon or boron.

9. The high specific surface area electrode of claim 1 wherein the film layer is first applied to the substrate as a precursor, the precursor reacted to form an oxide of at least one of the metals from Groups III, IV, V, VI and VII of the Periodic Table and the oxide film layer further subsequently reacted with a source of nitrogen, carbon or boron.

10. The high specific surface area electrode of claim 2 wherein the oxide film layer comprises a high specific surface area oxide prior to being subsequently reacted.

* * * * *